(12) United States Patent
Bissonnette (10) Patent No.: US 9,011,758 B2
(45) Date of Patent: Apr. 21, 2015

(54) METHOD AND SYSTEM FOR CONTROLLING A CUTTING TORCH

(75) Inventor: Claude Bissonnette, Cornwall (CA)

(73) Assignee: 1432899 Ontario Inc., Cornwall, Ontario (CA)

(*) Notice: Subject to any disclaimer, the term of this patent is extended or adjusted under 35 U.S.C. 154(b) by 377 days.

(21) Appl. No.: 13/521,481

(22) PCT Filed: Jan. 11, 2011

(86) PCT No.: PCT/CA2011/000030
§ 371 (c)(1),
(2), (4) Date: May 15, 2013

(87) PCT Pub. No.: WO2011/082492
PCT Pub. Date: Jul. 14, 2011

(65) Prior Publication Data
US 2013/0221585 A1  Aug. 29, 2013

Related U.S. Application Data

(60) Provisional application No. 61/293,894, filed on Jan. 11, 2010.

(51) Int. Cl.
*B23K 7/00* (2006.01)
*B23K 7/10* (2006.01)
*F23D 14/42* (2006.01)
*F23N 1/02* (2006.01)
*F16L 41/00* (2006.01)

(52) U.S. Cl.
CPC . *B23K 7/10* (2013.01); *F23D 14/42* (2013.01); *F23N 1/02* (2013.01); *F16L 41/00* (2013.01)

(58) Field of Classification Search
CPC .......... B23K 7/10; F16L 41/00; F23D 14/38; F23D 14/42
USPC .................................. 266/48, 76; 148/195
See application file for complete search history.

(56) References Cited

U.S. PATENT DOCUMENTS

| 4,439,249 A * | 3/1984 | Singh et al. .................... 148/195 |
| 5,470,047 A * | 11/1995 | Shin et al. ........................ 266/76 |
| 7,575,710 B2 * | 8/2009 | Bissonnette .................... 266/48 |
| 2008/0105336 A1 * | 5/2008 | Lotz ............................... 148/195 |

* cited by examiner

*Primary Examiner* — Scott Kastler
(74) *Attorney, Agent, or Firm* — Norton Rose Fulbright Canada LLP (57) ABSTRACT

A system for controlling a temperature of a flame of a torch for cutting a piece of material, comprising: a valve system fluidly connectable to an oxygen source and a fuel source for receiving a heating oxygen flow and a fuel flow, respectively, and the torch for propagating the heating oxygen and fuel flows thereto, the valve system comprising at least a first adjustable valve and a second adjustable valve for regulating the heating oxygen flow and the fuel flow, respectively; and a control unit comprising a memory and a processor configured for: receiving data indicative of a desired temperature for the flame; determining, from the data, a corresponding amount of heating oxygen and a corresponding amount of fuel adapted to provide the flame with the desired temperature; and adjusting the valves to provide the torch with the corresponding amount of heating oxygen and the corresponding amount of fuel.

20 Claims, 8 Drawing Sheets

METHOD AND SYSTEM FOR CONTROLLING A CUTTING TORCH

CROSS-REFERENCE TO RELATED APPLICATIONS

The present application claims priority under 35 USC §119 (e) of US Provisional Patent Application bearing Ser. No. 61/293,894, filed on Jan. 11, 2010, the contents of which are hereby incorporated by reference.

TECHNICAL FIELD

The present invention relates to the field of torch cutting systems, and particularly to methods and apparatuses for controlling a torch cutting system.

BACKGROUND

In steel mills, metal such as steel is molten and cast to obtain pieces of metal, which may have different shapes and sizes. In some steel mills, the obtained pieces of metal are subsequently cut into smaller pieces. Usually, a cutting torch is used for cutting the pieces of metal. The torch provides a flame having a specific temperature for heating the pieces of metal up to a desired temperature, and a jet of oxygen for cutting the pieces of metal. The specific heating temperature is obtained by providing the torch with fuel and oxygen in appropriate quantities. In steel mills, a centralized valve system is usually present for controlling the flow of gases for a plurality of torches. Because the centralized valve system is located away from the operators of the torches, the flow rates of gases for the torches are set to adequate values for heating and cutting the pieces of metal and not varied during a cutting session even when the torches are not used for cutting a piece of metal. Many steel mills cast various sizes or types of metals according to customer orders. Therefore the operators will adjust the centralized valve system to cut a specific material for that hour or day. When returning to cast thinner and easier to cut material, the operators may not reduce the pressures from the centralized valve system. This results in an increased consumption of gases Therefore, there is a need for an improved method and system for controlling cutting torches.

SUMMARY

In accordance with a first broad aspect, there is provided a system for controlling a temperature of a flame of a torch for cutting a piece of material, comprising: a valve system fluidly connectable to an oxygen source and a fuel source for receiving a heating oxygen flow and a fuel flow, respectively, and the torch for propagating the heating oxygen and fuel flows thereto, the valve system comprising at least a first adjustable valve and a second adjustable valve for regulating the heating oxygen flow and the fuel flow, respectively; and a control unit in communication with the valve system and comprising a processing unit and a memory, the processing unit configured for: receiving data indicative of a desired temperature for the flame; determining, from the data indicative of the desired temperature, a corresponding amount of heating oxygen and a corresponding amount of fuel adapted to provide the flame with the desired temperature; and adjusting the first and second adjustable valves to provide the torch with the corresponding amount of heating oxygen and the corresponding amount of fuel, and the flame with the desired temperature.

In accordance with another broad aspect, there is provided a method for adjusting a temperature of a flame of a torch, the method comprising: receiving data indicative of a desired temperature for the flame of the torch; determining a given amount of heating oxygen and a given amount of fuel from the data indicative of the desired temperature, the heating oxygen and the fuel feeding the flame and the given amount of heating oxygen and the given amount of fuel being adapted to provide the flame with the desired temperature; and providing the given amount of heating oxygen and the given amount of fuel to the torch, thereby providing the flame with the desired temperature.

In accordance with a further broad aspect, there is provided a gas flow regulating apparatus for a cutting torch, comprising: a body having: an oxygen inlet connectable to an oxygen source; a heating oxygen outlet connectable to the cutting torch; a first manifold and a second manifold each fluidly connecting the heating oxygen outlet to the oxygen inlet; a fuel inlet connectable to a fuel source; a fuel outlet connectable to the cutting torch; and a third manifold and a fourth manifold each fluidly connecting the fuel outlet to the fuel inlet, a first valve adjustable and positioned within the first manifold for regulating a heating oxygen flow propagating in the first manifold, a second valve positioned within the second manifold for regulating a stand-by oxygen flow propagating in the second manifold; a third valve adjustable and positioned within the third manifold for regulating a heating fuel flow propagating in the third manifold; and a fourth valve positioned within the fourth manifold for regulating a stand-by fuel flow propagating in the fourth manifold.

The expression "piece of metal" refers to any body made of metal and having any shape and size. Slabs, blooms, rounds, billets, ingots, sheets, and the like are example of pieces of metal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
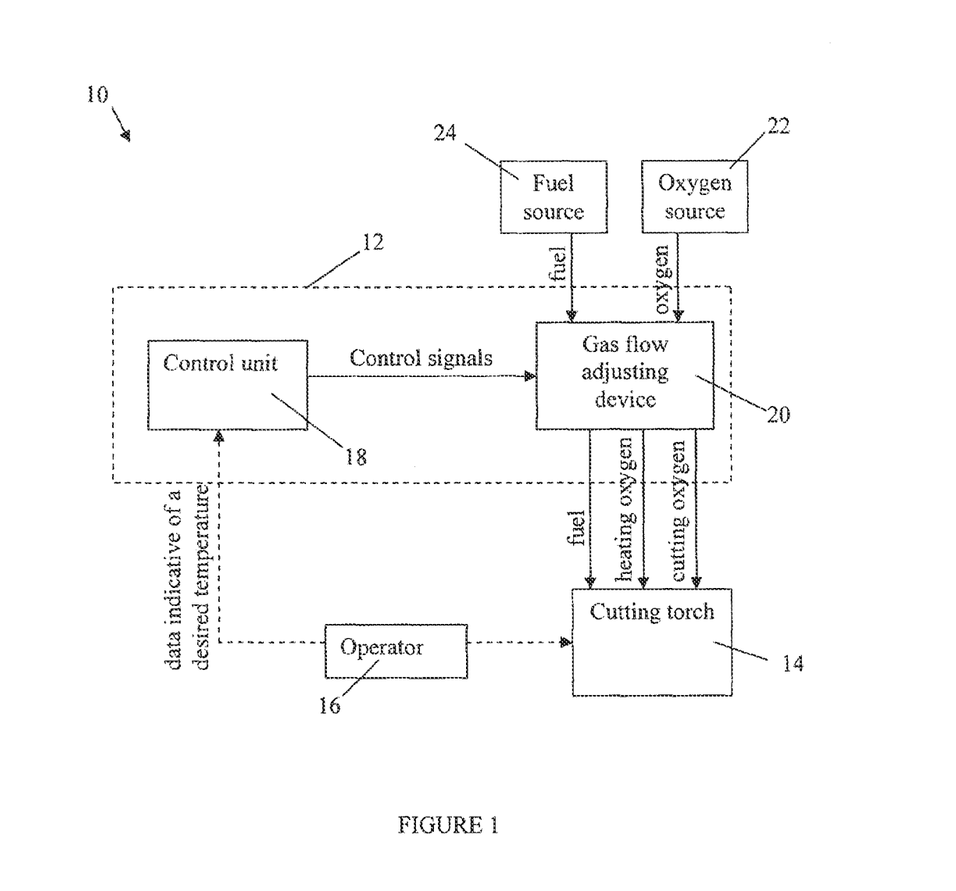
FIG. 1 is a block diagram illustrating a torch cutting system, in accordance with an embodiment.

FIG. 1 illustrates a cut torch system 10 which can be used for cutting pieces of metal, for example. The cut torch system 10 comprises a gas flow control system 12 and at least one cutting torch 14. The cutting torch 14 provides a heating flame for heating the piece of metal to be cut and a jet of cutting oxygen for cutting the piece of metal. An operator 16 of the cutting torch 14 controls the temperature of the flame of the torch 14 via the control system 12 and operates the cutting torch 14.

The control system 12 comprises a control unit 18 in communication with a gas flow adjusting device 20. The gas flow adjusting device 20 is connected to oxygen and fuel sources 22 and 24, respectively, and adapted to deliver adequate amount of heating oxygen and fuel to the cutting torch 14 via pipes, for example, so that the flame of the torch 14 reaches a desired temperature.

In one embodiment, the gas flow adjusting device 20 also regulates the flow of cutting oxygen delivered to the cutting torch and used for cutting the piece of metal. In this case, the flow of cutting oxygen may be controlled via the control unit 18.

While the present description refers to a single source 22 of oxygen for providing oxygen to the gas flow adjusting device 20, it should be understood that the gas flow adjusting device 20 may be connected to two oxygen sources, i.e. a heating oxygen source and a cutting oxygen source.

In one embodiment, the adequate amounts of heating oxygen and fuel are provided to the torch 14 by controlling the pressure of heating oxygen and fuel flows provided to the cutting torch, respectively. In another embodiment, the adequate amounts of heating oxygen and fuel are provided to the torch 14 by controlling the flow rate of heating oxygen and fuel flows provided to the cutting torch 14, respectively.

The control unit 18 comprises a memory and a processing unit configured for receiving data indicative of a desired flame temperature from the operator of the cutting torch 14, and determining from the received data the amount of heating oxygen and fuel to be provided to the cutting torch in order to provide the flame with the desired temperature, and adjusting the gas flow adjusting device 20 by sending control signals indicative of the adequate amount of heating oxygen and fuel to the gas flow adjusting device 20. Upon reception of the control signals, the gas flow adjusting device 20 adjusts the amount of heating oxygen and fuel to the adequate values in order to provide the flame with the desired temperature.

In one embodiment, the control unit 18 comprises a processing unit and a memory for storing a database of data values indicative of different flame temperatures and corresponding predetermined amounts of heating oxygen and fuel for creating the heating flame. Each set of predetermined amounts of heating oxygen and fuel corresponds to a predetermined temperature for the torch flame. When the operator 16 enters a command indicative of a desired flame temperature, the control unit 18 determines the corresponding amounts of fuel and heating oxygen to be delivered to the cutting torch 14 using the database. Control signals representing the determined amounts are then sent to the gas flow adjusting device 20. In one embodiment, the processing unit of the control unit 18 is adapted to determine the adequate amounts of heating oxygen and fuel using the database and any adequate interpolation method. For example, if the value of the data entered by the user does not correspond to any of the data values stored in the database, the processing unit may determine the amounts of heating oxygen and fuel using any adequate interpolation methods such as a linear interpolation method, a polynomial interpolation method, or the like. In one embodiment, the database comprises data values indicative of different flame temperatures and corresponding predetermined flow rates for the heating oxygen and the fuel to be delivered to the cutting torch 14. In this case, the processing unit determines the adequate flow rates for the heating oxygen and the fuel using the database and sends control signals indicative of the adequate flow rates to the gas flow adjusting devices 20 which adjusts the flow rates of the heating oxygen and fuel delivered to the cutting torch to the received adequate flow rate values. In another embodiment, the database comprises data values indicative of different flame temperatures and corresponding predetermined pressures for the heating oxygen and the fuel to be delivered to the cutting torch 14. In this case, the processing unit determines the adequate pressures for the heating oxygen and the fuel using the database and sends control signals indicative of the adequate pressures to the gas flow adjusting devices 20 which adjusts the pressures of the heating oxygen and fuel delivered to the cutting torch 14 to the received adequate pressure values.

In another embodiment, the processor is configured for determining the amounts of heating oxygen and fuel to be provided to the torch 14 to obtain the desired flame temperature using the data indicative of the desired temperature and a proportionality relation between the flame temperature and the amounts of heating oxygen and fuel feeding the flame. In this case, a reference flame temperature, corresponding reference amounts of heating oxygen and fuel, and a proportionality constant are stored in the memory and the processing unit determines the adequate amounts of heating oxygen and fuel for obtaining the desired flame temperature using the data stored in the memory. It should be understood that the proportionality relation can also be between the pressure or the flow rate of the heating oxygen and fuel and the flame temperature. In this case, the memory comprises references pressures or flow rates for the heating oxygen and fuel. For example, when the fuel delivered to the torch 14 is natural gas, the reference temperature can be set to 747, 780 btu and the corresponding reference pressures for the heating oxygen and fuel are 30 psi and 15 psi, respectively. The proportionality relation between the flame temperature expressed in btu and the gas pressures expressed in psi is the following. An increase of the heating oxygen by 10 psi combined to an increase of natural gas by 5 psi results in an increase of 30% of the flame temperature. Using this proportionality relation, the processing unit can determine the adequate pressure for the heating oxygen and natural gas for providing the flame with the desired temperature.

It should be understood that the data entered by the operator 16 can be any type of adequate data indicative of the desired temperature for the flame. For example, the data indicative of the desired temperature for the torch flame can be a temperature value for the torch flame, a type of metal, a dimension of the piece to be cut such as a thickness of the piece to be cut, and/or the like.

In one embodiment, the data indicative of a desired temperature for the torch flame comprise a temperature value. In this case, the memory of the control unit 18 may comprise a database of torch flame temperatures and corresponding predetermined amounts of heating oxygen and fuel or corresponding predetermined flow rates or pressures for the heating oxygen and the fuel used for creating the heating flame.

In another embodiment, the data indicative of the desired temperature comprise a type of metal to be cut. In this case, the memory of the control unit 18 stores a database of types of metals and corresponding amounts of heating oxygen and fuel or corresponding pressures or flow rates for the heating oxygen and the fuel. For example, if the flow rates are to be adjusted, the corresponding flow rates correspond to a desired heating flame temperature adapted to heat the corresponding type of metal up to a specific temperature. For example, if he is cutting a piece of low carbon metal, the operator 16 chooses the option "low carbon metal" and the control unit 18 determines the corresponding flow rates for the fuel and heating oxygen in order to obtain a flame temperature adapted to heat low carbon metal up to an adequate temperature. In this case, the flame temperature would be low since the temperature of the piece of metal would be high when reaching the cutting torch. Alternatively, if he is cutting a piece of high carbon metal, the operator 16 chooses the option "high carbon metal" and the control unit 18 determines the corresponding flow rates for the fuel and heating oxygen in order to obtain a flame temperature adapted to heat high carbon metal up to an adequate temperature. In this case, the flame temperature would be high since the temperature of the piece of metal would be low when reaching the cutting torch.

In a further embodiment, the data indicative of a desired temperature for the torch flame comprise a value of the thickness of the piece to be cut. In this case, the memory of the control unit 18 may comprise a database of different thicknesses and corresponding amounts of heating oxygen and fuel or corresponding pressures or flow rates for the heating oxygen and the fuel. For example, if the flow rates are to be adjusted, the corresponding flow rates correspond to a desired heating flame temperature adapted to heat the piece of metal having a specific thickness.

In one embodiment, the control system 12 is customizable and the amounts of gas, flow rates, or pressures for the fuel and heating oxygen stored in the memory are predetermined in accordance with the pieces of equipment and needs of a user. For example, the amounts of gas, flow rates, or pressures are determined in accordance with factors such as the length of pipes connecting the gas flow adjusting device to the cutting torch 20, the type of metal to be cut, dimensions and temperature of the piece of metal to be cut, the number of cutting torches connected to the gas flow adjusting device 20, and/or the like.

In one embodiment, the gas flow adjusting device receives the control signals indicative of the determined amounts, flow rates, or pressures and adjusts the flow of heating oxygen and the flow of fuel in accordance with the control signals via at least two adjustable valves. The heating oxygen and the fuel provided with the appropriate amounts, flow rates, or pressures are then sent to the cutting torch 14.

In one embodiment, the processing unit of the control unit 18 is further adapted to determine the opening for the adjustable valves corresponding to the determined amounts, flow rates, or pressures. In this case, the control signals sent from the control unit 18 to the gas flow adjusting device 20 are indicative of an opening position for the valves regulating the flow of heating oxygen and fuel.

In one embodiment, the gas flow adjusting device 20 is adapted to provide the cutting torch 14 with cutting oxygen at an appropriate flow rate or pressure. The control unit 18 is adapted to receive a command indicative of a desired flow rate for the cutting oxygen from the operator 16 and determine a corresponding flow rate for the cutting oxygen. The control unit 18 then sends a control signal to the gas flow adjusting device 20 which adjusts the flow rate of the cutting oxygen to the appropriate flow rate. In one embodiment, the command sent to the control unit 18 is an on/off command and the control unit 18 opens or closes the flow of cutting oxygen delivered to the cutting torch 14 via the gas flow adjusting device 20. In this case, the flow rate of the cutting oxygen is fixed to a desired value at the entry of the gas flow adjusting device 20. In another embodiment, the operator 16 may choose a specific and adjustable flow rate for the cutting oxygen. In this case, the control unit 18 sends a control signal representing the desired cutting oxygen flow rate to the gas flow adjusting device 20 which adjusts the flow rate of the cutting oxygen to the desired flow rate. Alternatively, the command entered by the operator 16 may be a type of metal to be cut and/or a thickness of the piece of metal to be cut. In this case, the control unit 18 is adapted to determine the flow rate for the cutting oxygen in accordance with the command. The control unit 18 can comprise a database of elements such as types of metal, thicknesses, and/or the like and corresponding cutting oxygen flow rates.

In one embodiment in which the flow rate or pressure of the cutting oxygen is adjustable, the cutting oxygen flow rate is determined in accordance with the pieces of equipment and/or needs of a customer. For example, the cutting oxygen flow rate can be determined in accordance with factors such as the length of pipes connecting the gas flow adjusting device 20 to the cutting torch 20, the type of metal to be cut, dimensions of the piece of metal to be cut, the temperature of the piece of metal to be cut when reaching the cutting torch 14, and/or the like.

In one embodiment, the control system 12 comprises two modes, i.e. a "pilot" or stand-by mode and a "heating" mode. The "pilot" mode corresponds to a stand-by flame and the "heating" mode corresponds to a heating flame adapted to heat the piece of metal up to a desired temperature. The stand-by flame is defined as a minimal flame which consumes minimal amount of fuel and heating oxygen. Stand-by amounts, flow rates, or pressures for the fuel and heating oxygen adapted to create the stand-by flame are stored in the memory of the control unit 12. Alternatively, the stand-by amounts, flow rates, or pressures may be set by a valve and the control unit 12 is adapted to open and close the valve. Upon reception of a stand-by command indicative that a stand-by flame is desired, the processing unit adjusts the amounts, flow rates, or pressures for the heating oxygen and fuel flows to the stand-by values.

The heating flame is defined as a flame having a temperature adapted to heat the piece of metal to the desired temperature. Heating amounts, flow rates, or pressures for the fuel and heating oxygen adapted to create the heating flame are stored in the memory of the control unit 18 or determined by the control unit 18. In one embodiment, the control system 12 may comprise at least two heating modes each adapted to a type of metal to be cut, such as a "high carbon metal" mode and a "low carbon metal" mode. In the same or an alternate embodiment, the control system 12 may comprise a "boost" mode in which the amounts, flow rates, or pressures for the heating oxygen and fuel are increased with respect to those of the "heating" mode in order to reach a higher flame temperature.

It should be understood that the minimal amounts, flow rates, or pressures for the fuel and the heating oxygen for feeding the stand-by flame may be determined in accordance with factors such as the pieces of equipment and needs of a customer. For example, the minimal amounts, flow rates, or pressures for the fuel and the heating oxygen for feeding the stand-by flame may be determined in accordance with the length of pipes connecting the gas flow adjusting device 20 to the cutting torch 14.

Figure 2:
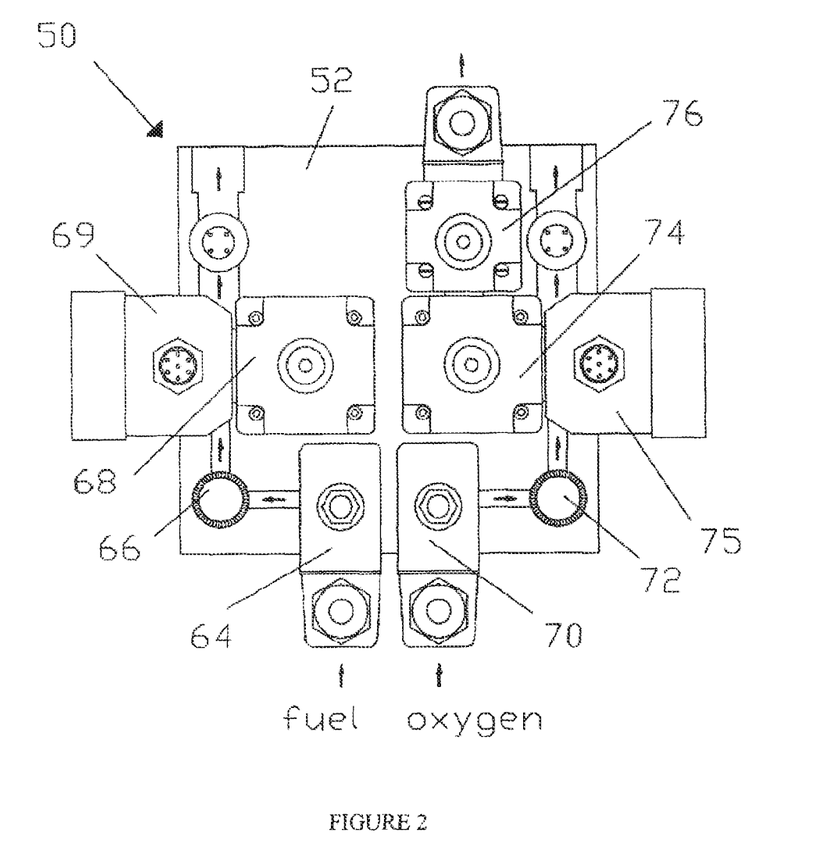
FIG. 2 is a top view of a gas flow adjusting device, in accordance with an embodiment
Figure 3:
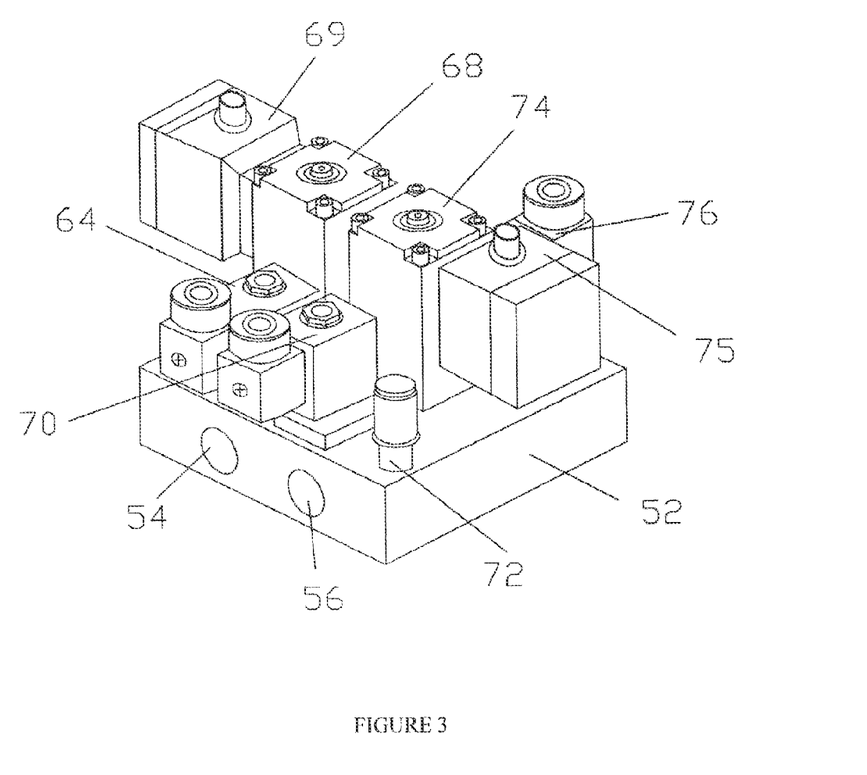
FIG. 3 is a perspective front view of the gas flow adjusting device of FIG. 2.
Figure 4:
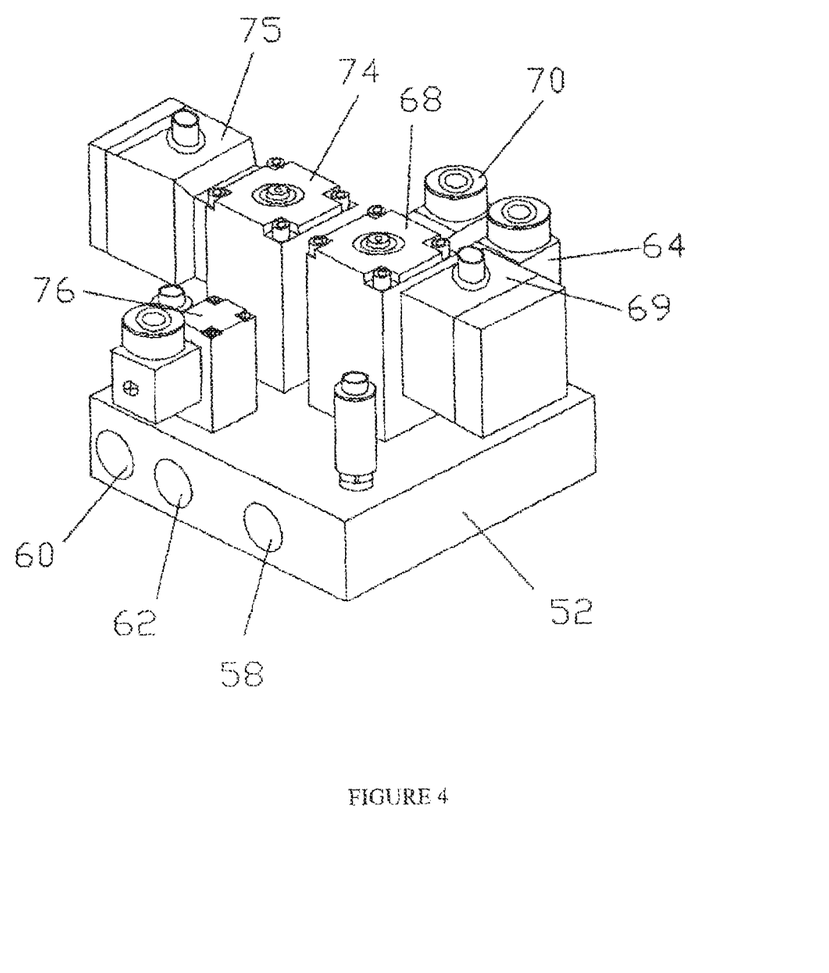
FIG. 4 is a perspective rear view of the gas flow adjusting device of FIG. 2.
Figure 5:
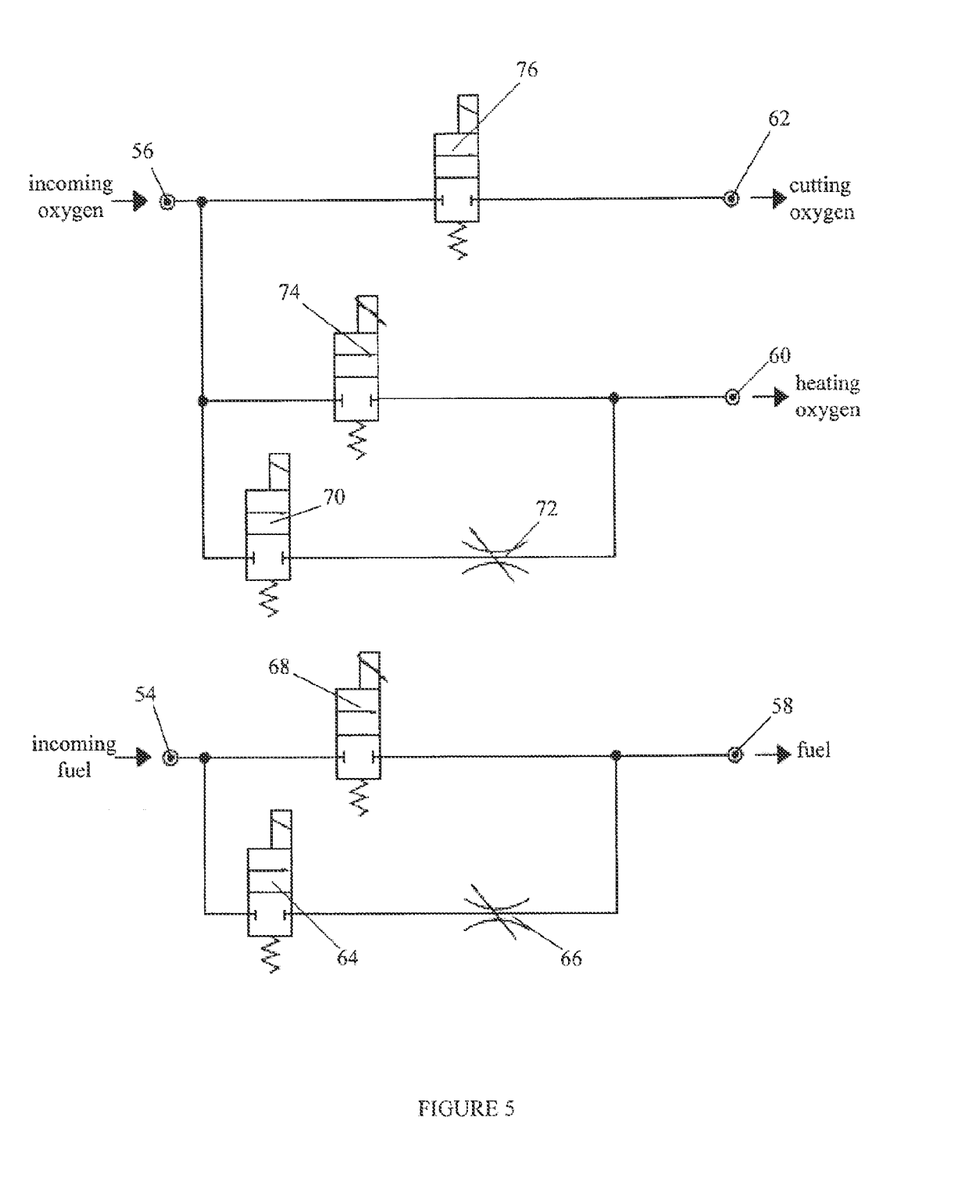
FIG. 5 is a schematic illustrating gas flows within the gas flow adjusting device of FIG. 2.

FIGS. 2-4 illustrate one embodiment of a gas flow adjusting device or gas flow regulating device 50 while FIG. 5 illustrates the flow scheme for the gas flow adjusting device 50. The gas flow adjusting device 50 comprises a body 52 having a fuel inlet 54, an oxygen inlet 56, a fuel outlet 58, a heating oxygen outlet 60, and a cutting oxygen outlet 62. The fuel inlet 54 and the oxygen inlet 56 are respectively fluidly connected to a source of fuel and a source of oxygen while the fuel outlet 58, the heating oxygen outlet 60, and the cutting oxygen outlet 62 are fluidly connected to a cutting torch. The cutting oxygen outlet 62 provides the cutting torch with the flow of cutting oxygen used for cutting the piece of metal while the fuel outlet 58 and the heating oxygen outlet 60 respectively provide the cutting torch with the flow of heating fuel and the flow of heating oxygen used for feeding the flame of the cutting torch.

A first manifold fluidly connects the fuel inlet 54 to the fuel outlet 58, and an on/off solenoid valve 64 and a needle valve 66 are operatively connected to the first manifold in order to control the flow rate of a fuel flowing within the first manifold. The fuel flowing in the first manifold is referred to as stand-by fuel since it is used to feed a stand-by flame. The on/off solenoid valve is used to allow or prevent the stand-by fuel to propagate up to the needle valve 66 which is used to adjust the flow of fuel within the first manifold. When the on/off solenoid 64 is closed, no fuel propagates up to the needle valve 66. By opening the on/off solenoid valve 64, a flow of stand-by fuel propagates up to the needle valve 66 which adjusts the flow rate of the stand-by fuel to a desired value. In one embodiment, the needle valve 66 is manually adjustable via a screw, for example.

A second manifold fluidly connects the fuel inlet 54 to the fuel outlet 58, and an adjustable solenoid valve 68 is operatively connected to the second manifold in order to control the flow rate of fuel flowing therein. The fuel flowing in the second manifold is referred to as heating fuel since it is used to feed a heating flame. The adjustable solenoid valve 68 is controlled by a valve controller 69 and adapted to regulate the flow of heating fuel in accordance with the control signal representative of the desired heating fuel flow rate and received by the valve controller 69 from the control unit.

A third manifold fluidly connects the oxygen inlet 54 to the heating oxygen outlet 60, and an on/off solenoid valve 70 and a needle valve 72 are operatively connected to the third manifold to control the flow rate of oxygen flowing within the third manifold. The oxygen flowing in the third manifold is referred to as stand-by oxygen since it is used to feed a stand-by flame. The on/off solenoid valve 70 is used to allow or prevent the stand-by oxygen to propagate up to the needle valve 72 which is used to adjust the flow of stand-by oxygen within the third manifold. When the on/off solenoid 70 is closed, no oxygen propagates up to the needle valve 72. By opening the on/off solenoid valve 70, a flow of stand-by oxygen propagates up to the needle valve 72 which adjusts the flow rate of the stand-by oxygen to a desired value. In one embodiment, the needle valve 72 is manually adjustable via a screw, for example.

A fourth manifold fluidly connects the oxygen inlet 56 to the heating oxygen outlet 60, and an adjustable solenoid valve 74 is operatively connected to the fourth manifold in order to control the flow rate of oxygen flowing therein. The oxygen flowing in the fourth manifold is referred to as heating oxygen since it is used to feed a heating flame. The adjustable solenoid valve 74 is controlled by a valve controller 75 and adapted to regulate the flow of the heating oxygen in accordance with the control signal representative of the desired heating oxygen flow rate and received by the valve controller 75 from the control unit 18.

A fifth manifold fluidly connects the oxygen inlet 56 to the cutting oxygen outlet 62 and an on/off solenoid valve 76 is used to allow or prevent a flow of oxygen up to the cutting oxygen outlet 62. The oxygen flowing in the fifth manifold is referred to as cutting oxygen since it is used to cut a piece of metal. Upon actuation of the solenoid valve 76, cutting oxygen flows within the fifth manifold and exits the gas flow adjusting device 50 by outlet 62. The flow of cutting oxygen then reaches the cutting torch and is used for cutting the piece of metal.

When the gas flow adjusting device 50 is connected to a control unit such as control unit 18, the operator may control the flame of the torch and actuate a jet of cutting oxygen via the control unit. In this case, the control unit is adapted to control the solenoid valves and 70 to light a stand-by flame, the adjustable solenoid valves 68 and 74 in order to control the torch flame temperature, and actuate the solenoid 76 for cutting a piece of metal. In one embodiment in which the needle valves 66 and 72 are adjustable, the operator may adjust the needle valves 66 and 72 via the control unit to obtain desired minimal flows of stand-by fuel and stand-by oxygen in the first and third manifolds, respectively.

In order to light the torch, the operator enters a stand-by command indicating the opening of the on/off solenoid valves 64 and 70. Upon reception of the stand-by command, the control unit actuates the on/off solenoid valves 64 and 70, thereby allowing stand-by fuel and stand-by oxygen to flow up to the needle valves 66 and 72 which respectively adjust the flow rates of the stand-by fuel and stand-by oxygen to the minimal flow rates. The stand-by fuel and stand-by oxygen having the desired minimal flow rate then exit the gas flow adjusting device 50 by outlets 58 and 60, respectively, and reach the torch which is lit, thereby providing a stand-by flame. The stand-by flame burns until a piece of metal is to be cut.

When he is ready to cut the piece of metal, the operator enters a heating command indicating a desired flame temperature for heating the piece of metal. It should be understood that the heating command can be a desired heating flame temperature, a type of metal, a thickness of the piece of metal, or the like, as described above. Alternatively, the heating command can be a particular mode, such as the "heating" mode. Upon reception of the heating command, the control unit determines the corresponding flow rates for the heating oxygen and heating fuel and adjusts the adjustable solenoid valves 68 and 74 to obtain the determined flow rates at the outlets 58 and 60. The heating oxygen flow coming from the adjustable solenoid valve 74 is combined with the stand-by oxygen flow coming from the needle valve 72 and the fuel flow coming from the adjustable solenoid valve 68 is combined with the stand-by fuel flow coming from the needle valve 6 to give a single oxygen flow and a single fuel flow having the determined flow rates. The single fuel flow and the single oxygen flow having the determined flow rates exit the gas flow adjusting device 50 by outlets 58 and 60, respectively, before reaching the cutting torch. This results in a torch flame having a temperature adequate for heating the piece of metal to be cut. The operator can then heat the piece of metal to be cut.

When he is ready to cut the piece of metal, such as once a small molten puddle of metal appears, the operator enters a cutting command in the control unit. Upon reception of the cutting command, the control unit opens the solenoid valve 76 and a flow of cutting oxygen propagates in the fifth manifold and exits the gas flow adjusting device 50 by outlet 62 before reaching the cutting torch. The jet of cutting oxygen exiting from the cutting torch is then used for cutting the piece of metal. Alternatively, the control unit can trigger the cutting mode after a predetermined period of time for the heating mode. In this case, the operator does not need to enter a cutting command.

Once the piece of metal has been cut, the operator sends a stop command to the control unit. Upon reception of the stop command, the control unit closes the solenoid valve 76 to prevent the cutting oxygen from flowing in the fifth manifold, and gradually closes the adjustable solenoid valves 68 and 74 in accordance with a ramping scheme or function so that the heating flame gradually decreases to a stand-by flame. If the operator requires multiple cuts, the cycle can automatically be restarted by the control unit 18 until the material has been completely cut up. It should be understood that any adequate ramping scheme or function may be used and stored in the memory of the control unit or determined by the processor of the control unit. For example, ramping of the flow rates may be stepwise or continuous and the duration of the ramping may vary. The decrease of the heating oxygen may be faster, slower, or substantially equal to the decrease of the heating fuel. The gradual decrease of the flow rates of heating oxygen and heating fuel reduces or substantially eliminates the risk of prematurely extinguishing the stand-by flame. It should be understood that a ramping scheme or function for the heating oxygen and fuel flow rates may also be used for heating the flame up to the desired temperature. In this case, the processing unit determines at least one intermediary flow rate for the heating oxygen flow and the heating fuel flow in addition to the determined heating oxygen and fuel flow rates corresponding to the desired flame temperature. The intermediary flow rate is comprised between the actual flow rate and the determined flow rate adapted to provide the flame with the desired temperature. The adjustable solenoid valves 68 and 74 first adjust the heating oxygen and fuel flow to the at least one intermediary flow rate and finally to the determined flow rate corresponding to the desired flame temperature so that the flame gradually reaches the desired temperature.

In one embodiment, the flow rates of the heating oxygen and heating fuel may be increased and subsequently decreased according to a ramp function during the heating of the piece of metal. For example, because the outer edges of thick and/or wide pieces of metal are cooler then the core of the pieces of metal, higher flame temperatures may be needed while heating the outer edges of such pieces of metal. In this case, the operator enters a heating command corresponding to a higher flame temperature when heating the outer edges of the piece of metal. Upon reception of this command, the control unit gradually adjusts the controllable solenoid valves 68 and 74 in accordance with the ramp function in order to gradually increase the flow rates of the heating fuel and heating oxygen, thereby gradually increasing the temperature of the torch flame. Once he has cut the outer edge of the piece of metal, the operator enters a command reducing the temperature of the flame. Upon reception of this command, the control unit gradually adjusts the controllable solenoid valves 68 and 74 in accordance with the ramp function in order to gradually decrease the flow rates of the heating fuel and heating oxygen, thereby gradually decreasing the temperature of the torch flame to its previous heating temperature. In one embodiment, the increase of the flow rates of the heating oxygen and heating fuel may last during a predetermined of time, after which the flow rates are decreased. The predetermined period of time may be set in accordance with the customer's needs.

It should be understood that the gas flow adjusting device 50 is exemplary only. Any adequate device capable of adjusting the flow rate or pressure of flows of stand-by fuel, heating fuel, stand-by oxygen, heating oxygen, and cutting oxygen may be used. Variants of the flow adjusting device 50 are also possible. For example, the solenoid 76 may be adjustable so that an operator may control the jet of the cutting oxygen via the control unit. The on/off solenoid valve 64 and needle valve 66, and the on/off solenoid valve 70 and needle valve 72 may be each replaced by an adjustable solenoid valve controlled via the control unit. In another example, the first and second manifold may be replaced by a single manifold provided with an adjustable valve. In this case, the single manifold is used for delivering fuel to the torch and the adjustable valve is used to adjust the flow rate of the fuel to a stand-by flow rate or a heating flow rate. The same configuration may be used for oxygen and the third and fourth manifolds.

While the present description refers to solenoid valves 68 and 74 which are adjustable and controllable via a control unit, it should be understood that any adequate type of adjustable and controllable valves may be used such as motorized valves, hydraulic valves, pneumatic valves, and the like.

While the present description refers to a gas flow adjusting device 50 adapted to regulate the flow rate of heating oxygen, fuel, and cutting oxygen, it should be understood that the gas flow adjusting device 50 can be adapted to regulate the amount of heating oxygen, fuel, and cutting oxygen provided to the torch, or the pressures of heating oxygen, fuel, and cutting oxygen.

In one embodiment, the gas flow adjusting device 50 may further comprise a first mass flow meter located between the valve 68 and the fuel outlet 58 for measuring the amount of fuel provided to the torch, and a second mass flow meter located between the valve 74 and the heating oxygen outlet 60 for measuring the amount of heating oxygen delivered to the torch. The first and second mass flow meters are I communication with the control unit. The processor of the control unit is further configured for comparing the measured amounts of heating oxygen and fuel to the previously determined amounts. If the measured amount for the heating oxygen and/or the fuel does not correspond to its respective previously determined amount, the processor is configured for adjusting the first and/or second valve 68 and 74 until the measured amount for the heating oxygen and/or the fuel corresponds to its respective previously determined amount.

In one embodiment in which the amounts of heating oxygen and fuel delivered to the torch are adjusted by controlling the flow rates of the heating oxygen and fuel flows, the gas flow adjusting device 50 may further comprise a first flow rate sensor located between the valve 68 and the fuel outlet 58 for measuring the flow rate of fuel provided to the torch, and a second flow rate sensor located between the valve 74 and the heating oxygen outlet 60 for measuring the flow rate of the heating oxygen delivered to the torch. The first and second flow rate sensors are in communication with the control unit. The processor of the control unit is further configured for comparing the measured flow rates for the heating oxygen and the fuel to the previously determined flow rates. If the measured flow rate for the heating oxygen and/or the fuel does not correspond to its respective previously determined value, the processor is configured for adjusting the first and/or second valve 68 and 74 until the measured flow rate for the heating oxygen and/or the fuel corresponds to its respective previously determined value in order to provide the flame with the desired temperature.

In one embodiment in which the amounts of heating oxygen and fuel delivered to the torch are adjusted by controlling the pressures of the heating oxygen and fuel flows, the gas flow adjusting device 50 may further comprise a first pressure sensor located between the valve 68 and the fuel outlet 58 for measuring the pressure of fuel provided to the torch, and a second pressure sensor located between the valve 74 and the heating oxygen outlet 60 for measuring the pressure of the heating oxygen delivered to the torch. The first and second pressure sensors are in communication with the control unit. The processor of the control unit is further configured for comparing the measured pressures for the heating oxygen and the fuel to the previously determined pressures. If the measured pressure for the heating oxygen and/or the fuel does not correspond to its respective previously determined value, the processor is configured for adjusting the first and/or second valve 68 and 74 until the measured pressure for the heating oxygen and/or the fuel corresponds to its respective previously determined value in order to provide the flame with the desired temperature.

Figure 6:
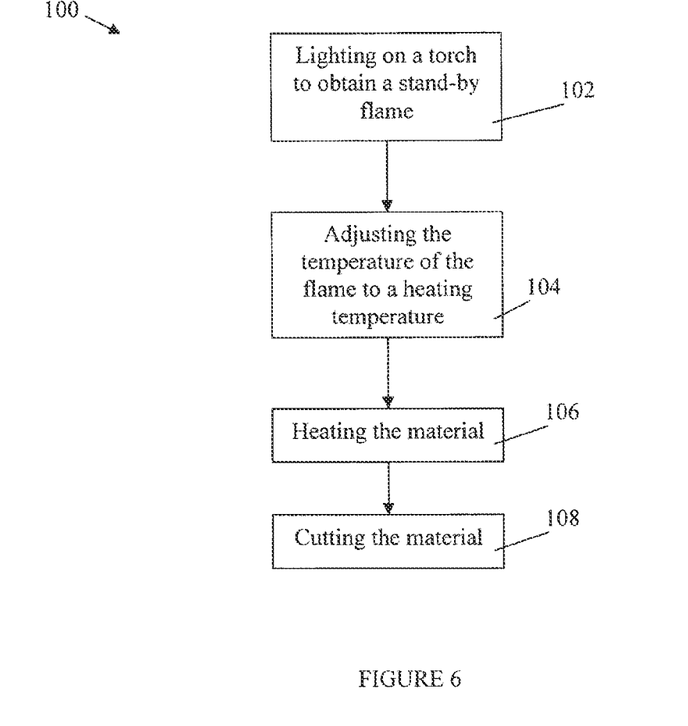
FIG. 6 is a flow chart of a first method for cutting a piece of metal, in accordance with one embodiment.

FIG. 6 illustrates one embodiment of a method 100 for cutting a piece of metal. The first step 102 comprises providing minimal flows of heating oxygen and fuel to a cutting torch and lighting the torch, thereby obtaining a stand-by flame. The next step 104 comprises increasing the amount of heating oxygen and fuel up to heating amounts adapted to increase the temperature of the torch flame to a heating temperature. The heating temperature for the flame is adapted to heat a piece of metal to be cut to a desired temperature. It should be understood that the amount of heating oxygen and fuel may be increased by increasing the flow rate or pressure of the heating oxygen and fuel delivered to the torch. The next step 106 comprises heating the piece of metal using the heating flame having the adequate heating temperature. The last step 108 comprises cutting the piece of metal using a jet of cutting oxygen having an adequate flow rate or pressure.

Figure 7:
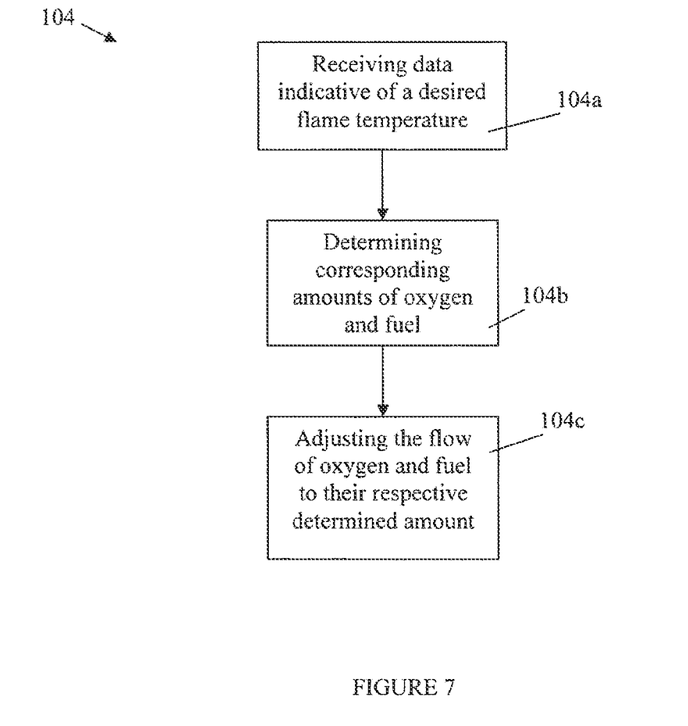
FIG. 7 is a flow chart of a method for adjusting the temperature of a flame to a heating temperature, in accordance with an embodiment.

As illustrated in FIG. 7, the step 104 of adjusting the temperature of the flame to the heating temperature is performed by the control system 12 and comprises the steps of receiving from the operator data indicative of a desired heating temperature for the torch flame (step 104a); determining the amounts of heating oxygen and fuel corresponding to the desired temperature (step 104b); and adjusting the flow of heating oxygen and fuel so that the determined amounts of heating oxygen and fuel be provided to the torch (step 104c), as described above. It should be understood that step 104b may comprise determining the pressures or flow rates for the heating oxygen and fuel that are adequate for providing the flame with the desired temperature. In this case, step 104c comprises adjusting the flow rate or the pressure of the heating oxygen and fuel to the values determined at step 104b.

In one embodiment, after cutting the piece of metal, the amounts, flow rates, or pressures for the heating oxygen and the fuel are decreased down to stand-by flow rates so that the torch flame returns to its stand-by conditions (step 102).

Figure 8:
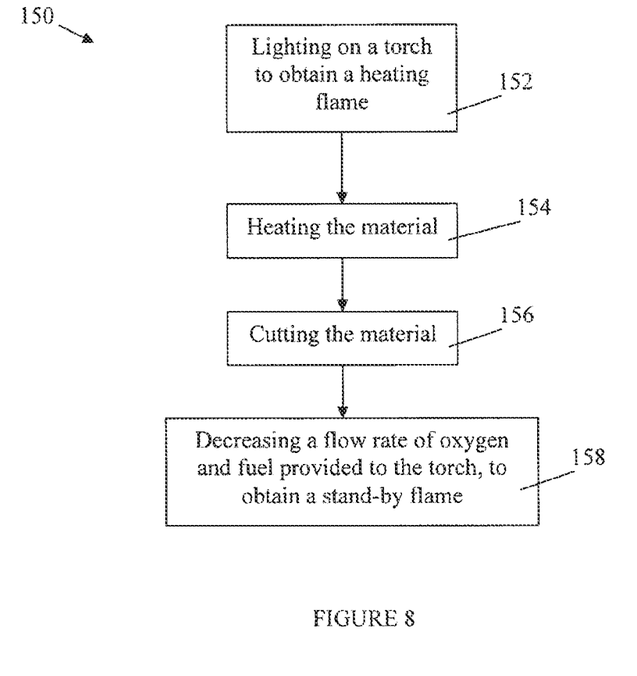
FIG. 8 is a flow chart of a second method for cutting a piece of metal, in accordance with one embodiment.

FIG. 8 illustrates a further embodiment of a method 150 for cutting a piece of metal. The first step 152 of the method 150 comprises lighting a cutting torch to obtain a heating flame having a temperature adapted to heat the piece of metal to a desired temperature. In one embodiment, the step 152 comprises providing the cutting torch with heating oxygen and fuel having heating flow rates and subsequently lighting the torch to obtain the heating flame. The heating flow rates are adapted to feed the flame so that its temperature be adapted to heat the piece of metal to the desired temperature. In another embodiment, the step 152 comprises providing the cutting torch with minimal flows of heating oxygen and fuel and lighting the torch, thereby obtaining a stand-by flame. Then the flow rates of heating oxygen and fuel are increased to heating flow rates adapted to increase the temperature of the torch flame to the heating temperature. The next step 154 comprises heating the piece of metal using the heating flame having the adequate heating temperature. At step 156, the piece of metal is cut using a jet of cutting oxygen having an adequate flow rate or pressure. The last step 158 comprises stopping the jet of cutting oxygen and decreasing the flow rates of the heating oxygen and fuel to minimal flow rates to obtain a stand-by flame.

When the torch flame is in the stand-by mode, minimal flows of heating oxygen and fuel are provided to the torch, thereby reducing the amounts of oxygen and fuel consumed compared to those consumed when the flame is in the heating mode. By increasing the flow rates of the fuel and the oxygen to obtain a heating flame only when required, i.e. when a piece of metal is to be cut, it is possible to reduce the overall amounts of consumed oxygen and fuel in addition to reduce the generation of carbon dioxide.

While step 158 of the method 50 refers to the reduction of the flow rate of the heating oxygen and fuel, it should be understood that step 158 may comprise decreasing the pressure of the heating oxygen and the fuel in order to decrease the amount of heating oxygen and fuel delivered to the torch.

In one embodiment, the gas flow adjusting device 20, 50 comprises pressure sensors such as pressure switches for example and/or flow sensors such as flow rate meters or mass flow meters for monitoring the pressure/flow rate/amount of the oxygen and fuel. The sensors are connected to the control unit which is adapted to trigger an alarm when an abnormal functioning is detected. For example, the alarm may be triggered when a spike or drop of pressure/flow rate/amount is detected. The control unit may also be adapted to stop the flow of gases upon detection of a problem. The control unit can also be connected to a network such as the Internet for example so that the cutting system 10 may be monitored and troubleshot from a remote location.

In one embodiment in which the gas flow adjusting device 20, 50 is adapted to monitor the flow rate and/or pressure and/or amount of the oxygen and fuel at the outlet of the gas flow adjusting device 20, 50, the control unit is adapted to adjust the flow rate, pressure, or amount of the oxygen and/or fuel in order to deliver oxygen and/or fuel at a substantially constant flow rate, pressure, or amount, thereby increasing the quality of the cuts.

In one embodiment in which the gas flow adjusting device 20, 50 is adapted to monitor the flow rate, pressure, and/or amount of the oxygen and fuel at the outlet of the gas flow adjusting device 20, 50, the control unit is adapted to determine the total consumption of oxygen and fuel, the consumption of oxygen and fuel when the flame is in the stand-by mode, the consumption of oxygen and fuel when the flame is in the heating mode, etc. The consumption data is stored in the memory of the control unit and can be accessed for cost of operation calculations.

In one embodiment, the present method allows for a reduction of wasted metal. Since increasing the amount of the cutting oxygen, the heating oxygen, and/or the fuel increases the width of the material being removed during the cutting operation, adjusting the amount of the cutting oxygen, the heating oxygen, and/or the fuel to adequate values allows for the reduction of the width of the material being removed, and therefore the reduction of the amount of wasted metal.

It should be understood that the control units and the gas flow adjusting devices described above may be used for implementing the methods 100 and 150.

While the description refers to a single torch for heating and cutting a piece of metal, it should be understood that a first torch may be used for creating the flame and heating the piece of metal, and a second torch may be used for providing the jet of cutting oxygen and cutting the piece of metal.

While the gas flow adjusting device 50 is adapted to control gas flows for a single cutting torch, it should be understood that the device 50 may be provided with more manifolds, solenoid valves and needle valves to feed a plurality of cutting torches in gases.

It should be understood that the gas flow adjusting device 50 may be used without a control unit. In this case, each valve may be provided with a controller that may be manually operated. For example, the flow rates of the heating oxygen and heating fuel may be set to a desired value using the controllers 69 and 75 and the on/off valves 64 and 70 may be manually open and closed.

It should be understood that any adequate fuel may be used for generating the torch flame. For example, methane, propane, butane, acetylene, propylene, hydrogen, mixes thereof, or the like can be combined with oxygen for creating the flame. It should also be understood that the purity of the oxygen may vary. In one embodiment, the oxygen has a purity of at least 99%. In another embodiment, low purity oxygen such as Pressure Swing Adsorption for example, may be used. A person skilled in the art would understand that the fuel and/or oxygen may be chosen as a function of a desired temperature for the flame.

It should be understood that the systems, devices, and methods described above can be used for heating and cutting any adequate type of metals or alloys such as ferrous alloys, stainless steel, carbon steel, alloy steel, tool steel, high-strength low-alloy (HSLA) steel, for example. It should also be understood that the systems, devices, and methods described above can be used for heating any adequate type of metals such as ferrous alloys, stainless steel, carbon steel, alloy steel, tool steel, high-strength low-alloy (HSLA) steel, alloys of copper, alloys of nickel, or the like.

The embodiments of the invention described above are intended to be exemplary only. The scope of the invention is therefore intended to be limited solely by the scope of the appended claims.

I claim:

1. A system for controlling a temperature of a flame of a torch for cutting a piece of material, comprising:
    a valve system fluidly connectable to an oxygen source and a fuel source for receiving a heating oxygen flow and a fuel flow, respectively, and the torch for propagating the heating oxygen and fuel flows thereto, the valve system comprising at least a first adjustable valve and a second adjustable valve for regulating the heating oxygen flow and the fuel flow, respectively, the valve system adapted to provide the torch with a stand-by amount of heating oxygen and a stand-by amount of fuel to generate a stand-by flame having a stand-by temperature; and
    a control unit in communication with the valve system and comprising a processing unit and a memory, the processing unit configured for:
        receiving data indicative of a desired temperature for the flame;
        determining, from the data indicative of the desired temperature, a corresponding amount of heating oxygen and a corresponding amount of fuel adapted to provide the flame with the desired temperature; and
        adjusting the first and second adjustable valves to provide the torch with the corresponding amount of heating oxygen and the corresponding amount of fuel, and the flame with the desired temperature.

2. The system of claim 1, wherein the processing unit is configured for determining a corresponding flow rate for the heating oxygen flow and the fuel flow from the data indicative of the desired temperature, the corresponding flow rate being adapted to provide the flame with the desired temperature, and adjusting the first and second adjustable valves to adjust a flow rate of the heating oxygen flow and the fuel flow to the corresponding flow rate.

3. The system of claim 1, wherein the processing unit is configured for determining a corresponding pressure for the heating oxygen flow and the fuel flow from the data indicative of the desired temperature, the corresponding pressure being adapted to provide the flame with the desired temperature, and adjusting the first and second adjustable valves to adjust a pressure of the heating oxygen flow and the fuel flow to the corresponding pressure.

4. The system of claim 1, wherein the memory comprises a database comprising values for the data indicative of the desired temperature and corresponding values for the heating oxygen flow rate and the heating fuel flow rate.

5. The system of claim 4, wherein the data indicative of the desired temperature comprises at least one of a value for the desired temperature, a type of material to be cut using the torch, and a thickness for the material to be cut using the torch.

6. The system of claim 1, wherein the processing unit is configured for gradually adjusting the first and second adjustable valves according to a ramping function in order to gradually provide the flame with the desired temperature.

7. The system of claim 1, wherein the valve system comprises a body having an oxygen inlet connectable to the oxygen source, a heating oxygen outlet connectable to the torch, and a first manifold and a second manifold each fluidly connecting the heating oxygen outlet to the oxygen inlet, the first adjustable valve positioned within the first manifold for providing the corresponding amount of heating oxygen, a first on/off valve and a first needle valve positioned within the second manifold for providing the stand-by amount of heating oxygen.

8. The system of claim 7, the body further comprises a fuel inlet connectable to the fuel source, a fuel outlet connectable to the torch, and a third manifold and a fourth manifold each fluidly connecting the fuel outlet to the fuel inlet, the second adjustable valve positioned within the third manifold for providing the corresponding amount of fuel, a second on/off valve and a second needle valve positioned within the fourth manifold for providing the stand-by flow amount of fuel.

9. The system of claim 8, wherein the processing unit is configured for closing the first and second on/off valves and opening the first and second adjustable valves to provide the corresponding amount of heating oxygen and the corresponding amount of fuel, respectively, upon reception of the data indicative of the desired temperature, and closing the first and second adjustable valves and opening the first and second on/off valves to provide the stand-by amount of heating oxygen and the stand-by amount of fuel upon reception of the stand-by command.

10. The system of claim 1, wherein the body further comprises a cutting oxygen outlet connectable to the torch and a fifth manifold fluidly connecting the oxygen inlet and the cutting oxygen outlet, a third adjustable valve positioned within the fifth manifold for controlling a flow of cutting oxygen, the control unit further adapted to receive a command indicative of a desired amount of cutting oxygen and adjust the third adjustable valve to deliver the desired amount of cutting oxygen to the torch.

11. A method for adjusting a temperature of a flame of a torch, said method comprising:
    receiving data indicative of a desired temperature for the flame of the torch;
    determining a given amount of heating oxygen and a given amount of fuel from the data indicative of the desired temperature, the heating oxygen and the fuel feeding the flame and the given amount of heating oxygen and the given amount of fuel being adapted to provide the flame with the desired temperature;

providing the given amount of heating oxygen and the given amount of fuel to the torch, thereby providing the flame with the desired temperature; and providing a stand-by amount of heating oxygen and a stand-by amount of fuel to the torch, thereby providing the torch with a stand-by flame having a stand-by temperature.

12. The method of claim 11, wherein said determining comprises determining a given flow rate for the heating oxygen and a given fuel flow rate for the fuel from the data indicative of the desired temperature, the given oxygen flow rate and the given fuel flow rate being adapted to provide the flame with the desired temperature, and said providing comprises adjusting a flow rate of the given oxygen to the heating oxygen flow rate and a flow rate of the fuel to the given fuel flow rate.

13. The method of claim 11, wherein said determining comprises determining a given oxygen pressure for the heating oxygen and a given fuel pressure for the fuel from the data indicative of the desired temperature, the given oxygen pressure and the given fuel pressure being adapted to provide the flame with the desired temperature, and said providing comprises adjusting a pressure of the heating oxygen to the given oxygen pressure and a pressure of the fuel to the given fuel pressure.

14. The method of claim 12, wherein said determining comprises retrieving the given amount of heating oxygen and the given amount of fuel from a database comprising values for the data indicative of the desired temperature and corresponding values for the given amount of heating oxygen and the given amount of fuel.

15. The method of claim 14, wherein the data indicative of the desired temperature comprises at least one of a value for the desired temperature, a type of material to be cut using the torch, and a thickness for the material to be cut using the torch.

16. The method of claim 11, wherein said providing comprises providing the given amount of heating oxygen and the given amount of fuel to the torch according to a ramping function, thereby gradually providing the flame with the desired temperature.

17. A gas flow regulating apparatus for a cutting torch, comprising:
a body having:
an oxygen inlet connectable to an oxygen source;
a heating oxygen outlet connectable to the cutting torch;
a first manifold and a second manifold each fluidly connecting the heating oxygen outlet to the oxygen inlet;
a fuel inlet connectable to a fuel source;
a fuel outlet connectable to the cutting torch; and
a third manifold and a fourth manifold each fluidly connecting the fuel outlet to the fuel inlet, and
a valve system comprising:
a first valve adjustable and positioned within the first manifold for regulating a heating oxygen flow propagating in the first manifold,
a second valve positioned within the second manifold for regulating a stand-by oxygen flow propagating in the second manifold;
a third valve adjustable and positioned within the third manifold for regulating a heating fuel flow propagating in the third manifold; and
a fourth valve positioned within the fourth manifold for regulating a stand-by fuel flow propagating in the fourth manifold;
the valve system adapted to provide the torch with a stand-by amount of heating oxygen and a stand-by amount of fuel to generate a stand-by flame having a stand-by temperature.

18. The gas flow regulating apparatus of claim 17, further comprising a first needle valve positioned within the second manifold and adapted to provide the stand-by amount of heating oxygen, and a second needle valve adapted to provide the stand-by amount of fuel and positioned within the fourth manifold, the second and fourth valve each being an on/off valve.

19. The gas flow regulating apparatus of claim 17, wherein the first, second, third, and fourth valves are each controllable by a control unit adapted to:
open the first, second, third, and fourth valves to provide a given amount of heating oxygen and a given amount of fuel, respectively, adapted to provide a flame for the cutting torch with a temperature adequate for cutting a piece of material; and
close the first and third valves and open the second and fourth valves to provide the stand-by amount of heating oxygen and the stand-by amount of fuel, respectively.

20. The gas flow regulating apparatus of claim 17, wherein the body further comprises a cutting oxygen outlet connectable to the cutting torch for providing a flow of cutting oxygen thereto and a fifth manifold fluidly connecting the oxygen inlet and the cutting oxygen outlet, a fifth valve being adjustable and positioned within the fifth manifold for regulating a flow of cutting oxygen.

* * * * *